(12) United States Patent
Tanaka et al.

(10) Patent No.: US 7,255,604 B2
(45) Date of Patent: Aug. 14, 2007

(54) CARD CONNECTOR

(75) Inventors: Akihiro Tanaka, Osaka (JP); Yasuo Nakai, Nara (JP)

(73) Assignee: Hosiden Corporation, Yao-shi, Osaka (JP)

( * ) Notice: Subject to any disclaimer, the term of this patent is extended or adjusted under 35 U.S.C. 154(b) by 260 days.

(21) Appl. No.: 11/134,475

(22) Filed: May 23, 2005

(65) Prior Publication Data

US 2005/0263597 A1 Dec. 1, 2005

(30) Foreign Application Priority Data

May 28, 2004 (JP) ............................. 2004-159263

(51) Int. Cl.
*H01R 24/00* (2006.01)
(52) U.S. Cl. ...................... 439/630; 439/680
(58) Field of Classification Search ................ 439/630, 439/680
See application file for complete search history.

(56) References Cited

U.S. PATENT DOCUMENTS

| | | | |
|---|---|---|---|
| 6,511,350 B1 * | 1/2003 | Ito et al. ..................... | 439/680 |
| 6,875,057 B2 * | 4/2005 | Miyazawa et al. .......... | 439/630 |
| 7,083,473 B1 * | 8/2006 | Lai ............................. | 439/630 |
| 7,090,536 B2 * | 8/2006 | Choy ......................... | 439/630 |
| 2004/0087211 A1 * | 5/2004 | Harasawa et al. .......... | 439/630 |
| 2006/0172603 A1 * | 8/2006 | Matsumoto et al. ........ | 439/630 |

FOREIGN PATENT DOCUMENTS

| | | |
|---|---|---|
| JP | 10-91729 | 4/1998 |
| JP | 10-187896 | 7/1998 |

* cited by examiner

*Primary Examiner*—Gary F. Paumen
(74) *Attorney, Agent, or Firm*—Bacon & Thomas, PLLC

(57) ABSTRACT

A resin body (2) cooperates with a cover (3) made of sheet metal to form a slot (5) into which a memory card (100) is to be inserted. The resin body has an erroneous card insertion preventing thickened portion (22) into which a core member (24) made of a material that is higher in strength than the resin forming the body is embedded. The thickened portion (22) is positioned in an erroneous insertion preventing notch region of the memory card (100) that is to be inserted in a card attachment position of the slot (5) in a normal insertion posture, and is to butt against an insertion end face of the memory card (100) that is erroneously inserted in a posture different from the normal insertion posture, to block the insertion of the memory card (100) to a card set position. An end face (25) of the core member (24) is protruded from an end face (23) of the thickened portion (22).

38 Claims, 13 Drawing Sheets

CARD CONNECTOR

BACKGROUND OF THE INVENTION

1. Field of the Invention

The present invention relates to a card connector which is used for electrically connecting a memory card to circuit boards of various electronic apparatuses, and which has a function of preventing erroneous insertion of a card.

2. Explanation of Related Art

In a conventional card connector, mechanical means for preventing erroneous insertion of a card to a card attachment position of a slot in a posture different from a normal insertion posture is known. Such means is configured in the following manner. A stopper which is formed by a plate spring as a separate part is attached to a housing in a cantilevered manner, or a stopper plate is cut and raised in a cantilevered manner from a sheet metal cover which cooperates with a resin body to form a housing. A free end of the stopper or the stopper plate butts against an insertion end face of a card which is erroneously inserted in a posture different from a normal insertion posture, thereby preventing the card from being inserted to an card attachment position (for example, see Japanese Patent Application Laying-Open Nos. 10-91729 and 10-187896).

In such conventional erroneous insertion preventing means, however, there is a possibility that, when an excessive pushing force is applied to a card, the card is damaged by the metal-made free end of the stopper or the stopper plate. In some cases, there is a possibility that a memory card is pierced with the free end of the stopper or the stopper plate and the card cannot be ejected. These troubles are more prominent as miniaturization of a card is further advancing.

By contrast, another configuration may be employed in which a part of the resin body of a housing is bulged to form a butting surface against which an insertion end face of a card that is erroneously inserted in a posture different from a normal insertion posture is to butt, thereby preventing the card from being inserted to a card attachment position. The configuration can solve the above-discussed problems, but the butting surface is hardly provided with sufficient breaking strength. The configuration has other drawbacks such as that the resin-to-resin contact causes the card to slip and escape from the butting surface, and hence a sufficient erroneous card insertion preventing performance is hardly obtained.

SUMMARY OF THE INVENTION

The invention has been conducted in view of such circumstances.

Namely, it is an object of the invention to provide a small and low-profile card connector in which novel erroneous card insertion preventing means is configured, and which has an erroneous card insertion preventing function that has an enhanced performance in response to miniaturization of a card. The erroneous card insertion preventing means can eliminate all the difficulties of erroneous card insertion preventing means made of a metal or a resin, has sufficient breaking strength so that, even when an excessive pushing force is applied to a card, the card is not easily broken, can prevent a card from being damaged or disabled from being ejected, and can obtain a sufficient erroneous card insertion preventing performance.

According to the invention, in order to attain the object, the card connector is configured in the following manner.

The card connector of the invention comprises: a housing 1 which is configured by a body 2 made of a resin, and a cover 3 made of a sheet metal, and which forms a slot inlet 4 through which a memory card 100 is to be inserted, and a slot 5 which is to house the memory card 100 inserted through the slot inlet 4; and contacts 6 which are mounted on the resin body 2, and which are to make contact with terminals 101 of the memory card 100 inserted and housed in a card attachment position of the slot 5, to establish electrical connection to the terminals. The card connector is characterized in that the card connector further comprises an erroneous card insertion preventing thickened portion 22 which is formed integrally with the resin body 2, which is to be positioned in an erroneous insertion preventing notch region of the memory card 100 that is inserted and housed in the card attachment position of the slot 5 in a normal insertion posture, and which is to butt against an insertion end face of the memory card 100 that is erroneously inserted in a posture different from the normal insertion posture, to block the insertion of the erroneously inserted memory card 100 to a card set position, and a core member 24 made of a material that is higher in strength than the resin forming the body 2 is embedded in the thickened portion 22.

According to the invention, the erroneous card insertion preventing thickened portion 22 has the structure in which the outer envelope is made of a resin, and the core member 24 made of a material that is higher in strength than the resin of the outer envelope, such as a metal, a ceramic, or a wood chip is embedded in the outer envelope. Therefore, high breaking strength which cannot be attained by the resin only can be ensured, and the thickened portion has sufficient breaking strength. The insertion end face of the erroneously inserted memory card 100 butts against the resin surface of the outer envelope of the thickened portion 22, thereby blocking the insertion of the memory card 100 to the card set position. Even when an excessive pushing force is applied to the memory card 100, therefore, the thickened portion 22 is not easily broken, and the insertion of the memory card 100 to the card set position can be blocked while preventing the memory card 100 from being damaged or disabled from being ejected.

In the invention, an end face 25 of the core member 24 is slightly protruded from an end face 23 of the thickened portion 22 against which the insertion end face of the erroneously inserted memory card 100 is to butt, thereby allowing the end face 25 of the core member 24 to bite the insertion end face of the erroneously inserted memory card 100 in a minimum degree. Therefore, the memory card 100 is prevented from slipping over the resin surface of the thickened portion 22. According to the configuration, the erroneously inserted memory card 100 can be surely received by the thickened portion 22 of the resin body 2, and it is possible to obtain a sufficient erroneous card insertion preventing performance which cannot be obtained by the resin only.

In the invention, the core member 24 can be configured by a material that is higher in strength than the resin forming the body 2, such as a metal, a ceramic, or a wood chip. Particularly, it is preferable to configure the core member by a metal material. According to the configuration, the thickened portion 22 can be provided with breaking strength which is equivalent to or higher than conventional erroneous card insertion preventing means made of a metal.

In the invention, preferably, a nonslip treatment (roughing process) such as a sandblast treatment or a knurling treatment is applied to the end face 25 of the core member 24 protruded from the end face 23 of the thickened portion 22 against which the insertion end face of the erroneously inserted memory card 100 is to butt. According to the configuration, the surface contacting with the insertion end face of the erroneously inserted memory card 100 has a large coefficient of friction, and the memory card 100 can be further surely prevented from slipping over the resin surface of the outer envelope of the thickened portion 22, so that the erroneous card insertion preventing performance can be further enhanced.

In the invention, preferably, tapered faces 23a and 25a for downward pressing the erroneously inserted memory card 100 are formed on the end face 23 of the thickened portion 22 against which the insertion end face of the erroneously inserted memory card 100 is to butt, and the end face 25 of the core member 24 protruded from the end face 23. According to the configuration, when the end face 23 of the thickened portion 22 and the end face 25 of the core member 24 receive the insertion end face of the erroneously inserted memory card 100, the memory card 100 is pressed against the resin body 2 by the tapered faces formed on the end faces, so that the memory card 100 can be prevented from escaping in the direction of upward pressing the cover 3. Therefore, the erroneous card insertion preventing performance can be further enhanced. In this case, a pressing projection 26 which is protruded toward the lower face of the erroneously inserted memory card 100 may be formed on the end face 25 of the core member 24 protruded from the end face 23 of the thickened portion 22 against which the insertion end face of the erroneously inserted memory card 100 is to butt. According to the configuration, when the end face 23 of the thickened portion 22 and the end face 25 of the core member 24 receive the insertion end face of the erroneously inserted memory card 100, the core member 24 is prevented from being raised, by the memory card 100 through the pressing projection 26. Therefore, the above-mentioned function of the tapered faces can be surely exerted.

In the invention, preferably, a bottom face of the core member 24 is exposed from a bottom face of the resin body 2, and the core member 24 is to be solder-fixed to a circuit board of an electronic apparatus. According to the configuration, the breaking strength of the thickened portion 22 itself, and the erroneous card insertion preventing performance can be further enhanced.

As described above, the invention achieves a remarkable effect that it is possible to provide a small and low-profile card connector in which novel erroneous card insertion preventing means that can eliminate all the difficulties of erroneous card insertion preventing means made of a metal or a resin, that has sufficient breaking strength so that, even when an excessive pushing force is applied to a card, the card is not easily broken, that can prevent a card from being damaged or disabled from being ejected, and that can obtain a sufficient erroneous card insertion preventing performance is configured, and which has an erroneous card insertion preventing function that has an enhanced performance in response to miniaturization of a card.

DESCRIPTION OF THE PREFERRED EMBODIMENT

Figure 1:
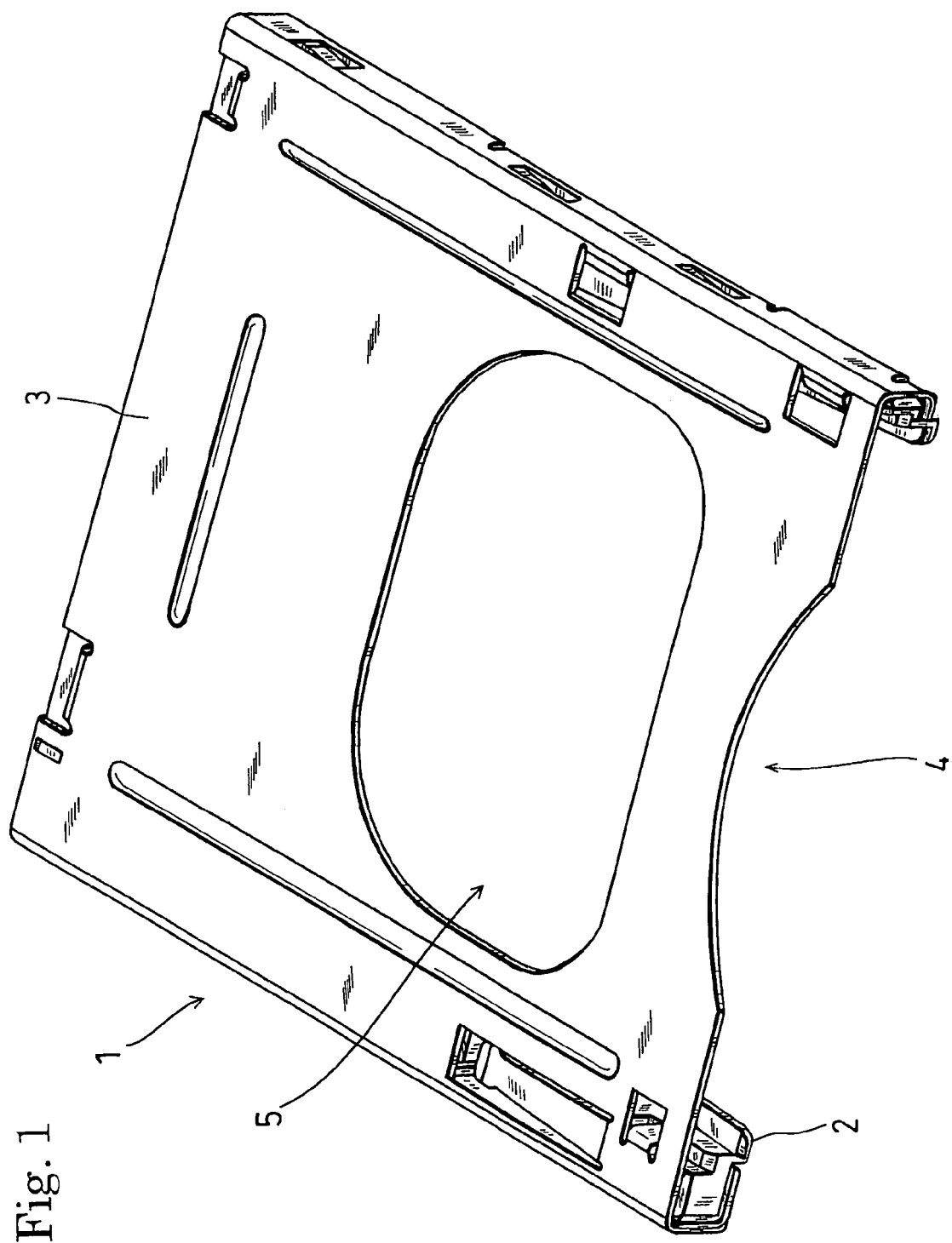
FIG. 1 is an external perspective view of a card connector of an embodiment as viewed from the front side.
Figure 2:
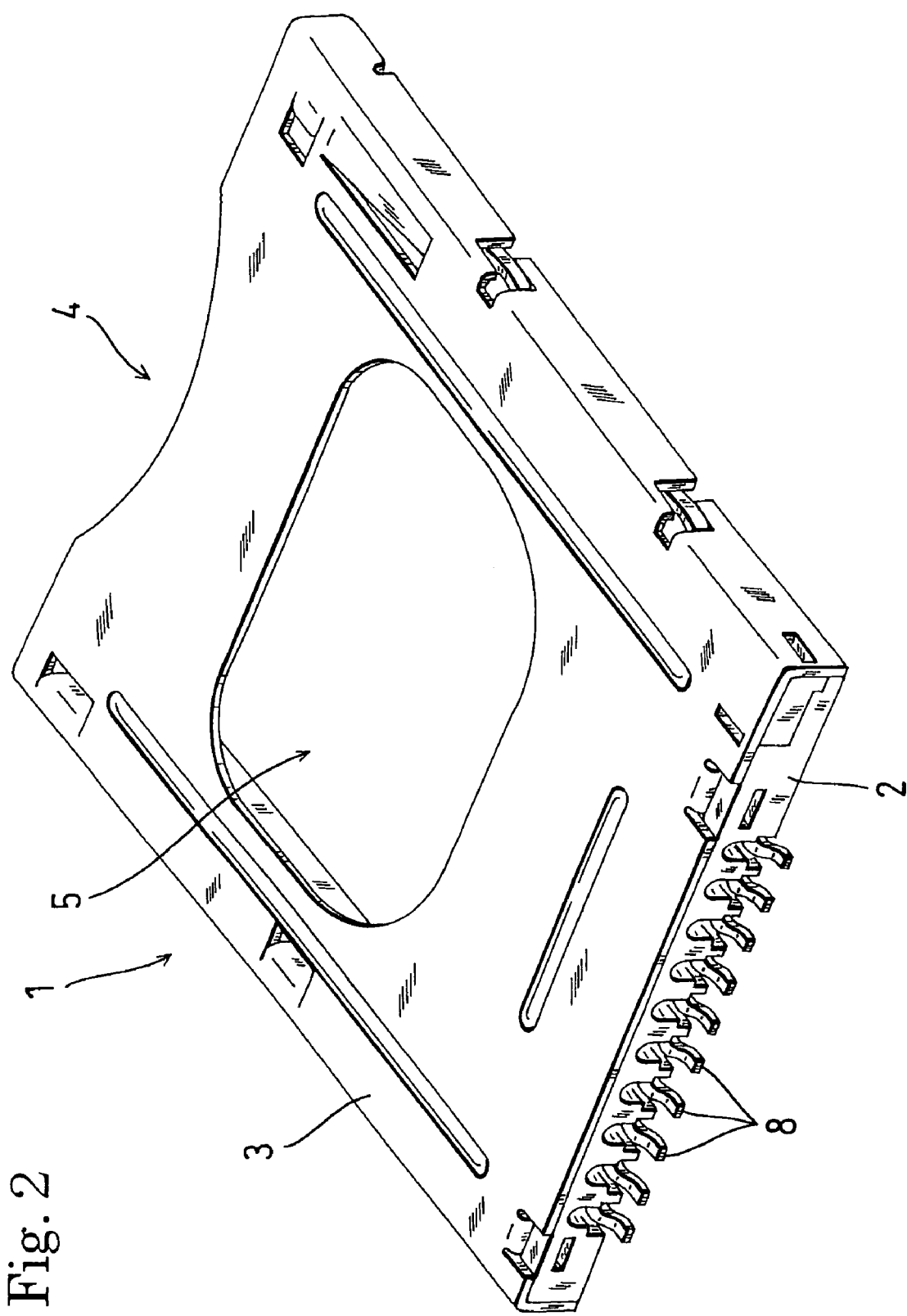
FIG. 2 is an external perspective view of the card connector of the embodiment as viewed from the rear side.
Figure 3:
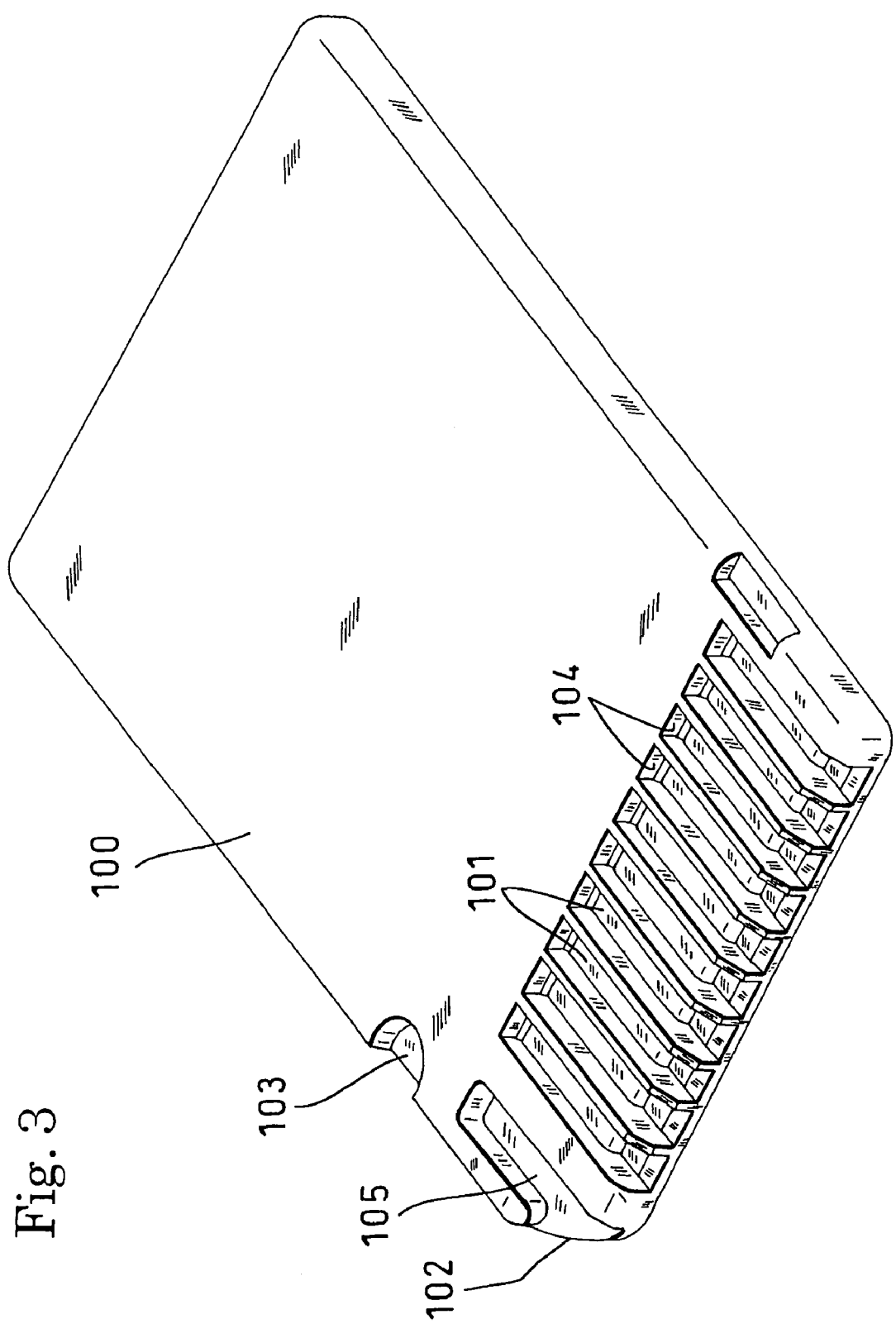
FIG. 3 is an external perspective view of a memory card which is to be used in the card connector of the embodiment.
Figure 4:
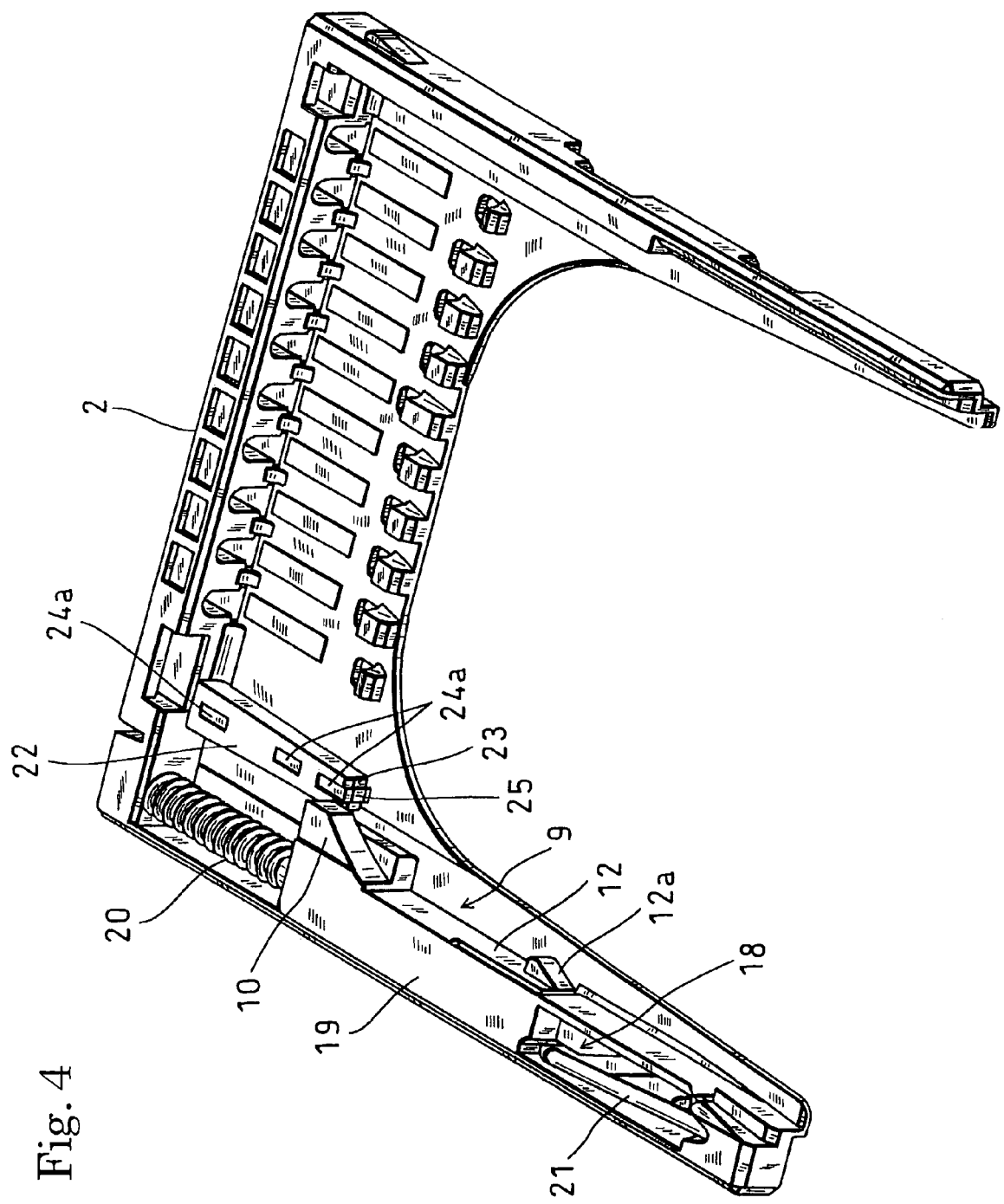
FIG. 4 is an external perspective view of a resin body of the card connector of the embodiment in a state where contacts and a cover are removed away.
Figure 5:
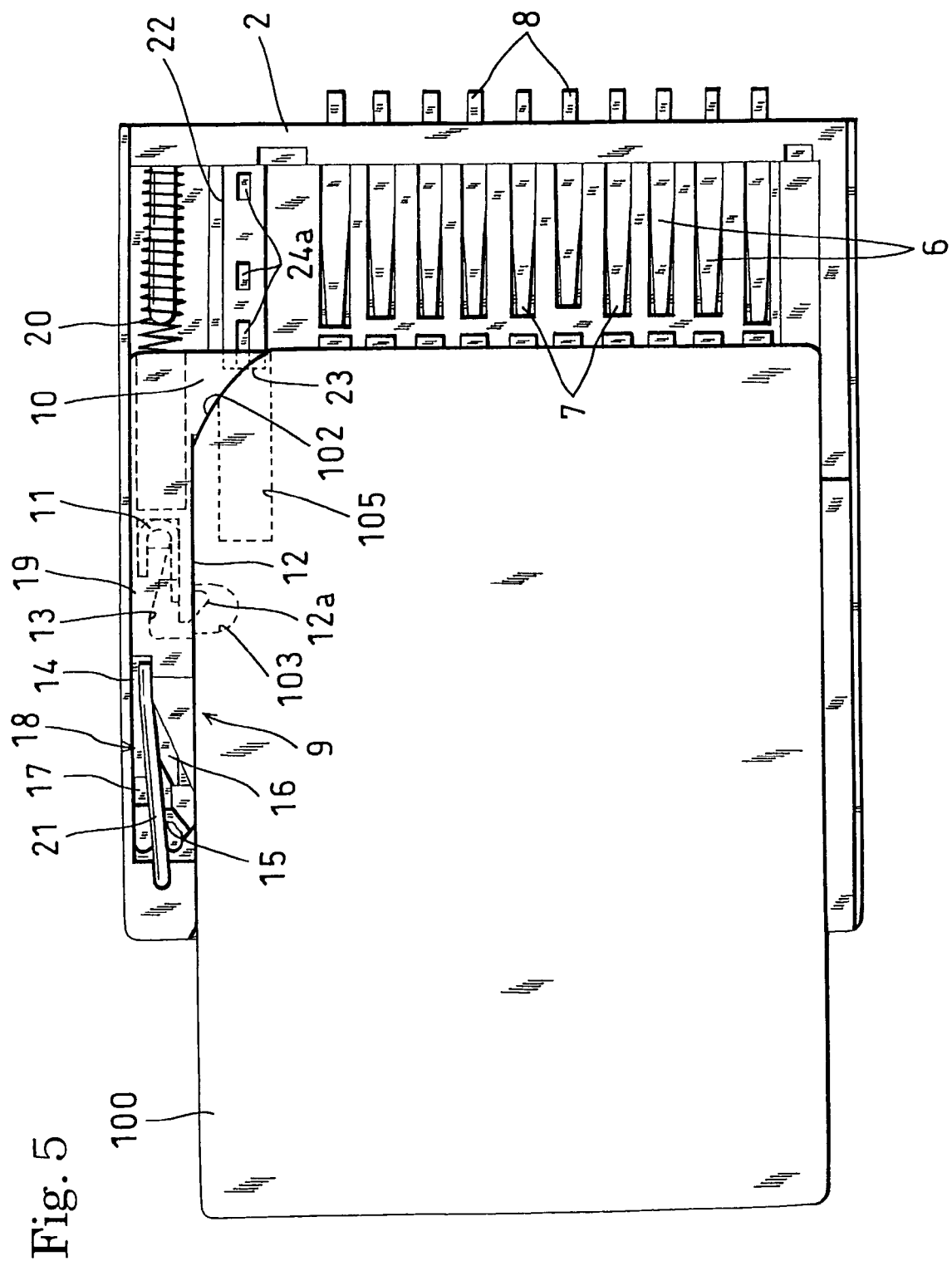
FIG. 5 is a plan view of the whole resin body of the card connector of the embodiment showing a card ejection state.
Figure 6:
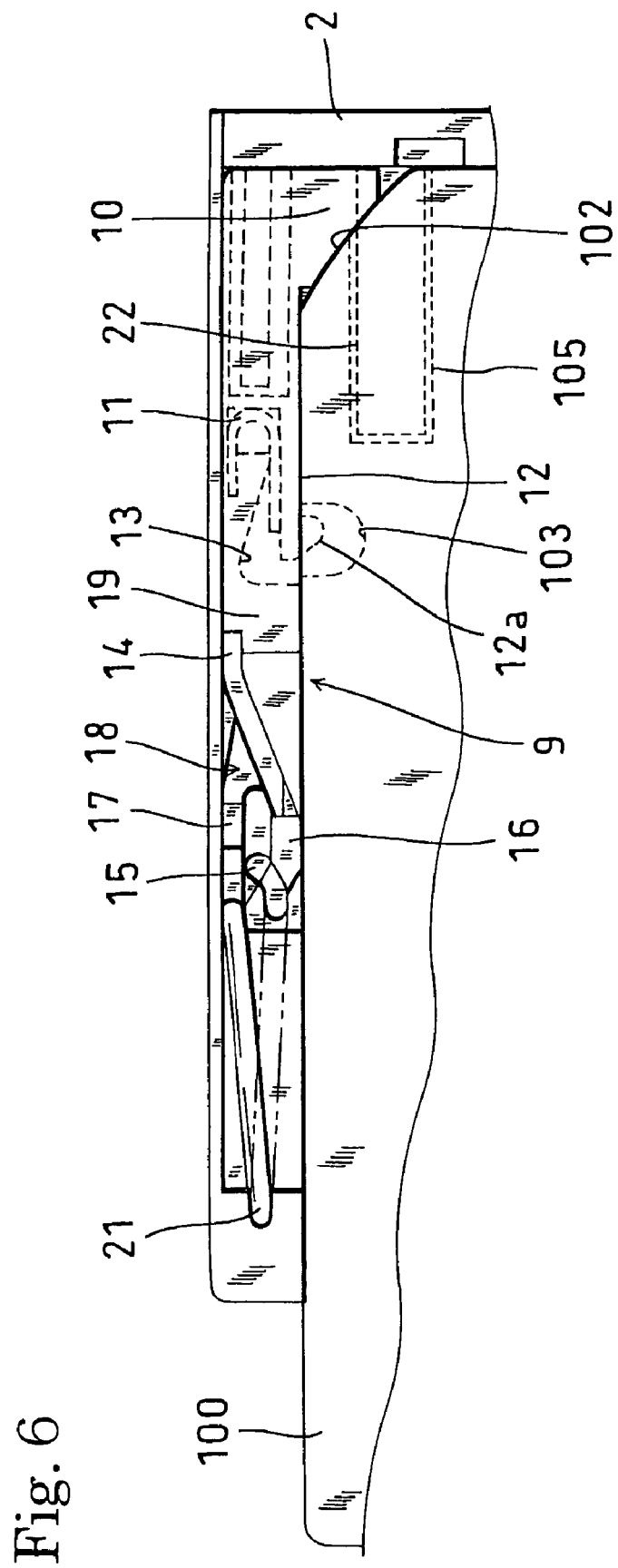
FIG. 6 is a partial plan view of the resin body of the card connector of the embodiment showing a state where the card is pushed to the innermost position.
Figure 7:
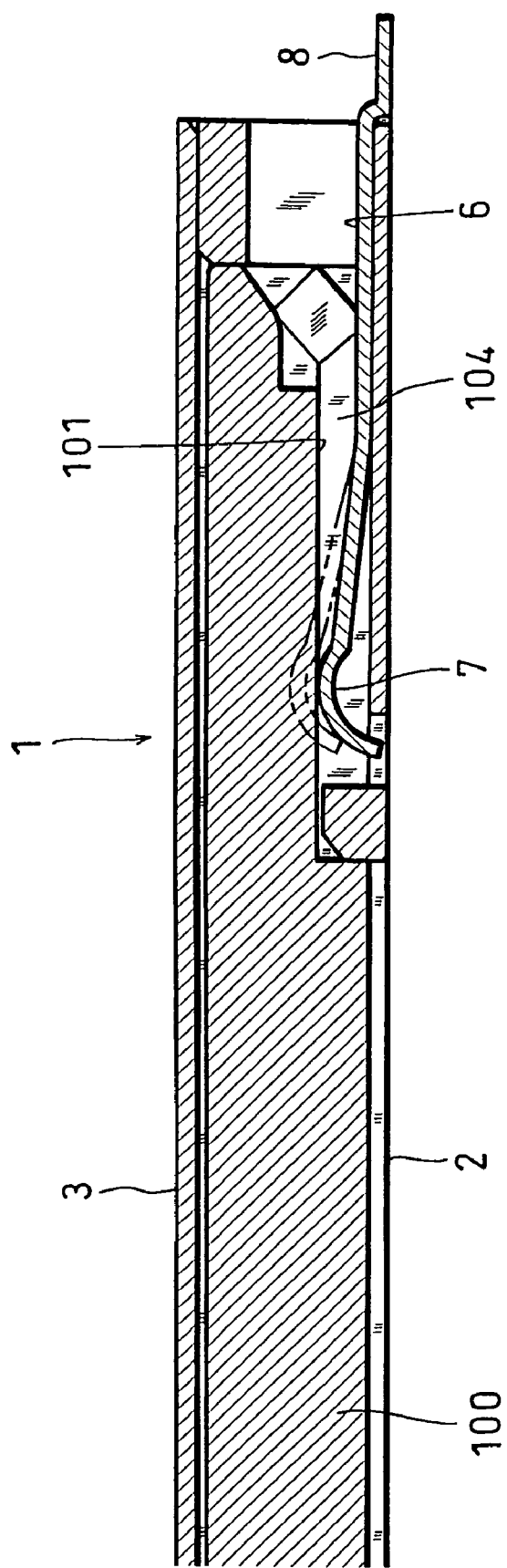
FIG. 7 is a section view of the card connector of the embodiment showing a state where the card is pushed to the innermost position.
Figure 8:
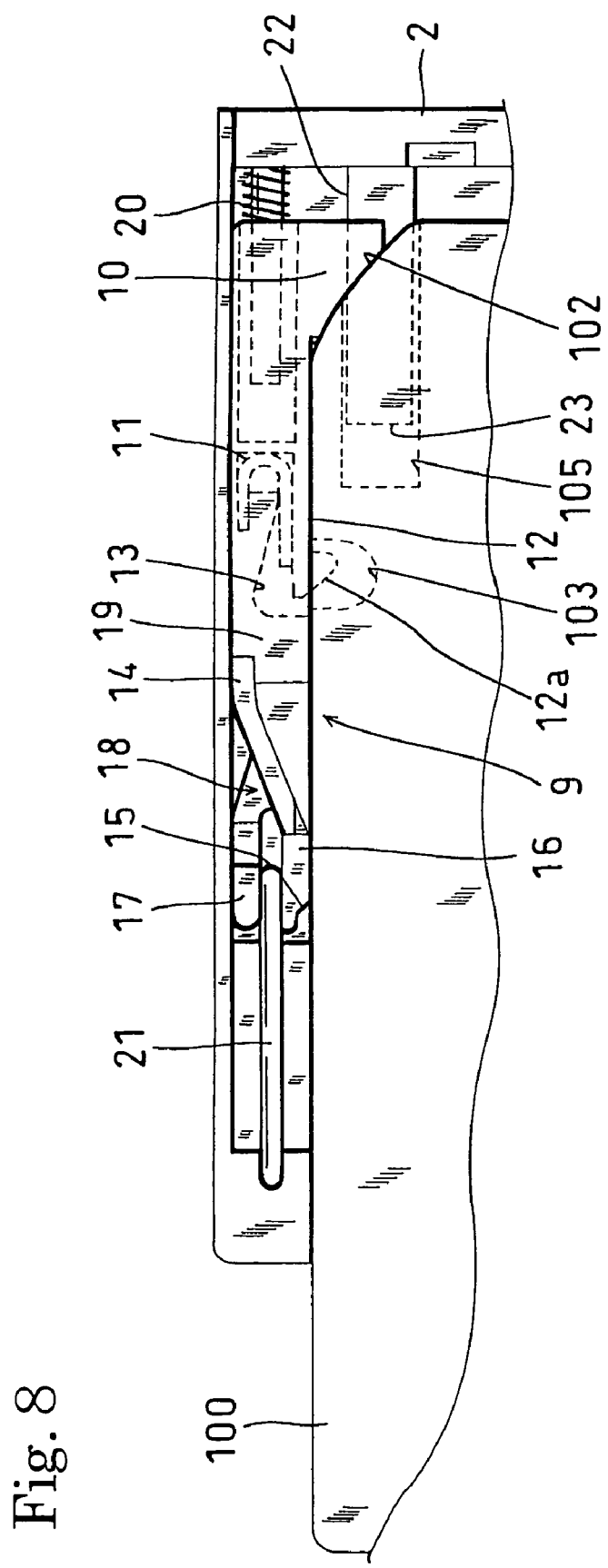
FIG. 8 is a partial plan view of the card connector of the embodiment showing a card attachment state.

Hereinafter, an embodiment of the invention will be described with reference to the accompanying drawings. FIGS. 1 to 8 show the basic configuration of a card connector of the embodiment. FIG. 1 is an external perspective view of a card connector of an embodiment as viewed from the front side, FIG. 2 is an external perspective view of the card connector of the embodiment as viewed from the rear side, FIG. 3 is an external perspective view of a memory card which is to be used in the card connector of the embodiment, FIG. 4 is an external perspective view of a resin body of the card connector of the embodiment in a state where contacts and a cover are removed away, FIG. 5 is a plan view of the whole resin body of the card connector of the embodiment showing a card ejection state, FIG. 6 is a partial plan view of the resin body of the card connector of the embodiment showing a state where the card is pushed to the innermost position, FIG. 7 is a section view of the card connector of the embodiment showing a state where the card is pushed to the innermost position, and FIG. 8 is a partial plan view of the card connector of the embodiment showing a card attachment state.

As shown in FIGS. 1 to 8, the card connector of the embodiment comprises a thin housing 1 having a rectangular box-like shape. The housing 1 is configured by an insulative resin body 2, and a cover 3 made of a sheet metal and fitted to the resin body 2. A slot inlet 4 through which a memory card 100 shown in FIG. 3 is to be inserted is opened in the front side face of the housing. The card 100 is inserted through the slot inlet 4 into the internal space of the housing 1 to be housed therein. Namely, the housing 1 forms a slot 5 in which the card 100 is to be inserted and housed.

The card connector of the embodiment further comprises a plurality of contacts (contact terminals) 6 for electrically connecting the card 100 to a circuit board of an electronic apparatus. The contacts 6 are configured by thin plates made of a conductive material (metal material), respectively, and integrally attached in juxtaposition to a rear portion of the body 2 by press insertion or insert molding. In each of the contacts 6, the front half is projected in a forward upward sloping manner from the surface of the rear portion of the body 2 (the bottom face of an inner portion of the slot 5) so as to be elastically deformable in a vertical direction. On the tip end portions having an elastic arm-like shape, disposed are internal contacts 7 which are to be contacted with and electrically connected to terminals 101 of the card 100 inserted and housed at a card attachment position of the slot 5. Rear end portions of the contacts 6 are projected from the rear side face of the resin body 2 to the outside of the housing 1. On the projected end portions, disposed are external contacts 8 that are to be electrically contacted by soldering to terminals of the circuit board on which the card connector of the embodiment is mounted.

The card connector of the embodiment further comprises an ejection mechanism 9 of the so-called push-in/push-out type as an internal mechanism. The ejection mechanism 9 is disposed in one internal side edge portion (in the embodiment, the left side portion) of the resin body 2 so as to be slidable in the anteroposterior direction, and has the following configuration.

A card receiving portion 10 which protrudes toward the inside of the resin body 2 is disposed in a rear end portion of the ejection mechanism 9.

An elastic arm portion 12 which houses and holds a plate spring 11, and behind which the plate spring 11 is disposed is in a middle portion of the ejection mechanism 9. A half-lock claw 12a which protrudes toward the inside of the resin body 2 is disposed at a tip end portion of the elastic arm portion 12. A recess 13 is formed in a middle portion of the ejection mechanism 9 so that the half-lock claw 12a is retractable.

The ejection mechanism 9 comprises:

a slider 19, in a front portion, having a cam groove 18 which is formed into an approximately heart-like shape, and in which a starting portion 14 at the rear end apex and an engagement portion 15 at the front end recess are connected to each other by a forward path 16 and a return path 17;

a coil spring 20 which always urges the slider 19 toward the front side;

a thin metal rod in which both end portions are perpendicularly bent; and a cam pin 21, one end bent portion of the cam pin being supported by the front end portion of the resin body 2 so as to be rotatable about the axis, the other end bent portion (swing bent portion) of the cam pin being slidably fitted into the cam groove 18.

When a card is not inserted, the slider 19 is returned and held by the coil spring 20 to an ejection position where the front end of the slider butts against the front end of the resin body 2, and the other end bent portion of the cam pin 21 is fitted into the starting portion 14 of the cam groove 18 (the state shown in FIGS. 4 and 5).

In the ejection mechanism 9, when the card 100 is inserted in the normal insertion posture from the slot inlet 4 into the slot 5, the card receiving portion 10 is fitted to a corner cut region of a corner cut portion 102 of the inserted card 100, and at the same time the half-lock claw 12a is fitted into a half-lock engagement groove 103 of the inserted card 100. As a result, the inserted card 100 and the slider 19 are engaged and coupled with each other in a card insertion/ejection direction (the state shown in FIG. 5). When the inserted card 100 is further inserted into the slot 5 in this state, the card receiving portion 10 is rearward pushed, and the slider 19 is rearward slid integrally with the inserted card 100 against the coil spring 20, from the ejection position to an innermost pushed position where the rear end of the slider 19 butts against that of the resin body 2 (the state of FIGS. 6 and 7, but excluding the cam pin 21 indicated by the solid line of FIG. 6). When the inserting force applied on the card 100 is canceled at this timing, the slider 19 is forward pushed back from the innermost pushed position by the coil spring 20. As a result of the series of operations starting from the ejection position of the slider 19, the other end bent portion of the cam pin 21 is introduced and engaged in the engagement portion 15 from the starting portion 14 of the cam groove 18 via the forward path 16, the forward sliding of the slider 19 is restricted at a position (card attachment position) which is slightly short of the innermost pushed position, and the position of the slider 19 with respect to the resin body 2 is held (locked) to the card attachment position. This causes the inserted card 100 which is engaged and coupled with the slider 19 in the card insertion/ejection direction, to be housed and held at the card attachment position of the slot 5, and at the same time the terminals 101 of the inserted card 100 make contact with and electrical connection to the internal contacts 7 of the contacts 6 (the state shown in FIG. 8).

When an operation of inserting the inserted card 100 is conducted in the state where the inserted card 100 is housed and held at the card attachment position of the slot 5 (the state shown in FIG. 8), the card receiving portion 10 is again rearward pushed, and the slider 19 is rearward slid integrally with the inserted card 100 against the coil spring 20, from the card attachment position to the innermost pushed position. The operation of pushing the slider 19 from the card attachment position to the innermost pushed position causes the other end bent portion of the cam pin 21 to be disengaged from the engagement portion 15 of the cam groove 18, and introduced into the return path 17, so that the forward sliding restriction of the slider 19 is canceled (the state of FIG. 6, but excluding the cam pin 21 indicated by the phantom line of FIG. 6). When the inserting force applied on the card 100 is canceled at this timing, the slider 19 is forward slid from the innermost pushed position by the coil spring 20 to return to the ejection position, and the inserted card 100 which is engaged and coupled with the slider 19 in the card insertion/ejection direction is discharged to the ejection position of the slot 5 and held to the ejection position (the state shown in FIG. 5). In the inserted card 100 held to the ejection position of the slot 5, the end portion protruding from the slot inlet 4 is pulled by picking with the fingers, whereby the half-lock claw 12a is disengaged from the half-lock engagement groove 103 of the inserted card 100. As a result, the half lock is cancelled, and the card is removed away from the slot 5 via the slot inlet 4.

The card connector of the embodiment having the above-described basic configuration is mounted onto a circuit board in a state where the external contacts 8 of the contacts 6 are electrically connected by soldering to terminals of the circuit board, and attached to an electronic apparatus so that the slot inlet 4 is opened in a slot hole formed in a housing of the electronic apparatus. The card connector exerts a function of electrically connecting the memory card 100 inserted and housed into the slot 5 via the slot inlet 4, to the circuit board of the electronic apparatus, thereby facilitating input and output of electronic data.

Figure 9:
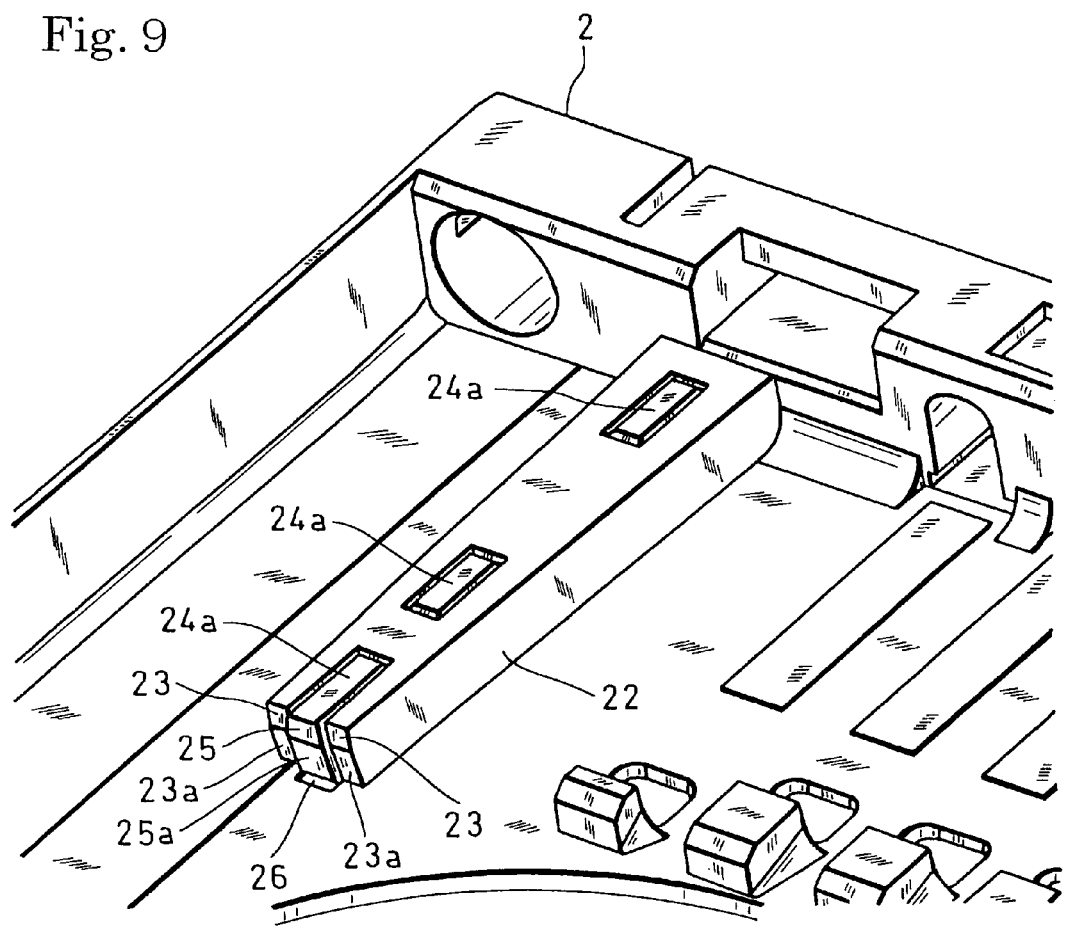
FIG. 9 is a partial enlarged perspective view of a resin body showing an erroneous card insertion preventing thickened portion disposed in the card connector of the embodiment.
Figure 10:
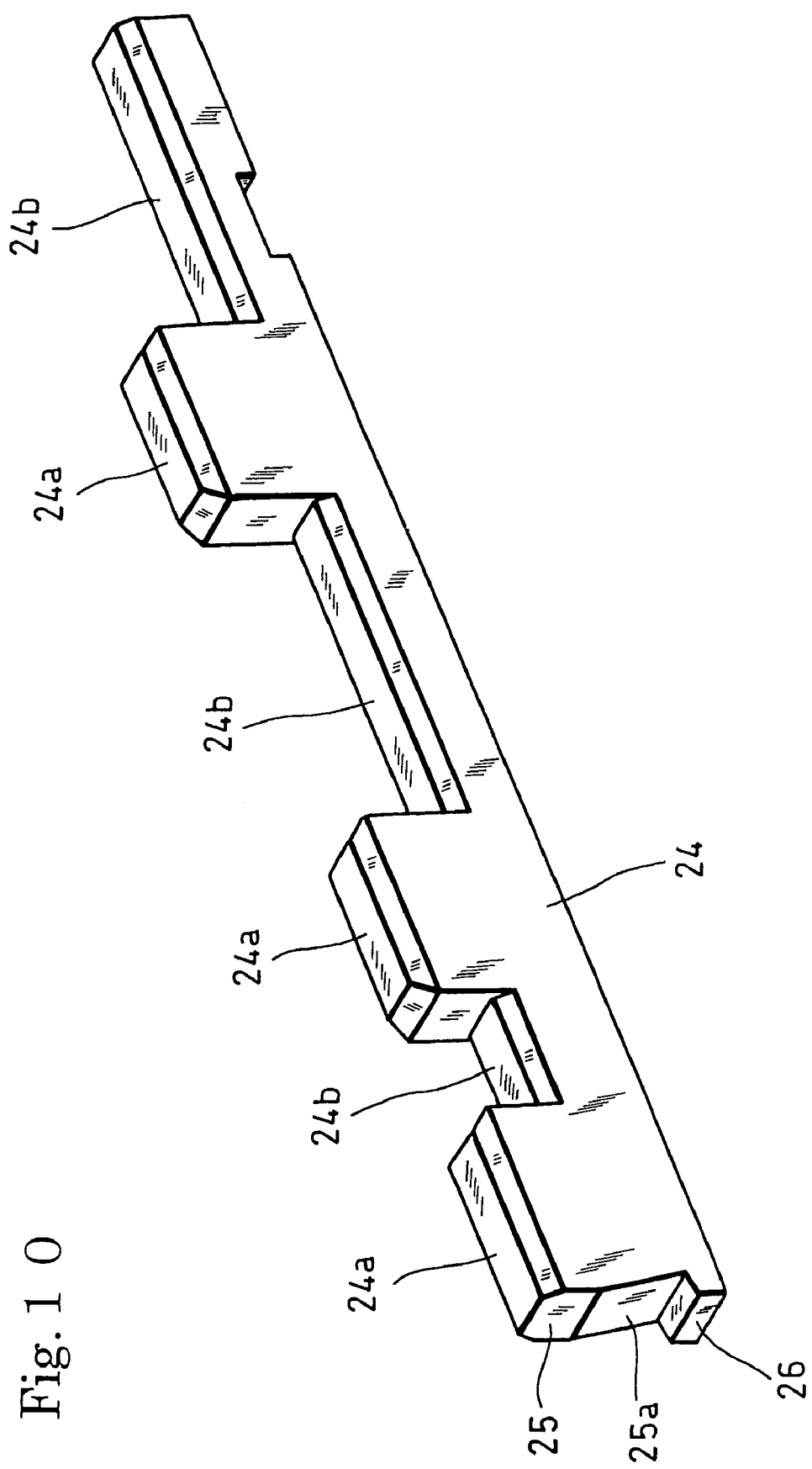
FIG. 10 is an external perspective view of a core member which is to be embedded in the erroneous card insertion preventing thickened portion disposed in the card connector of the embodiment.
Figure 11:
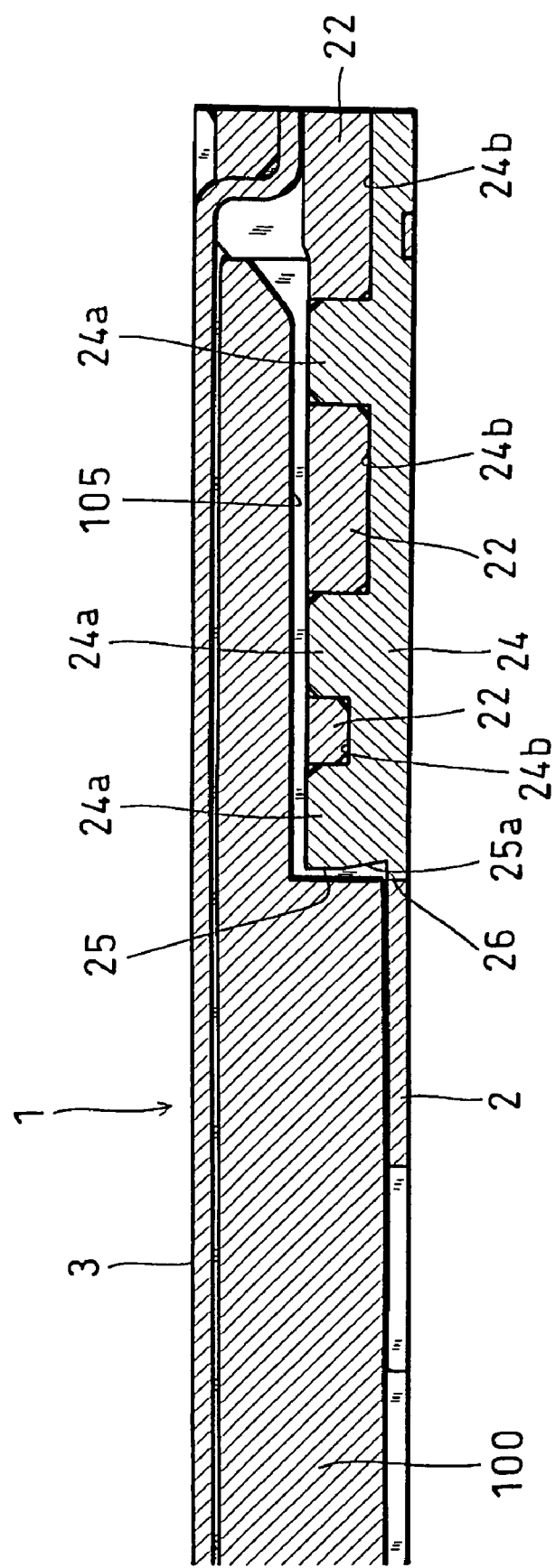
FIG. 11 is a section view illustrating the function of the erroneous card insertion preventing thickened portion in the case where the memory card is inserted into a slot of the card connector of the embodiment in a normal insertion posture.
Figure 12:
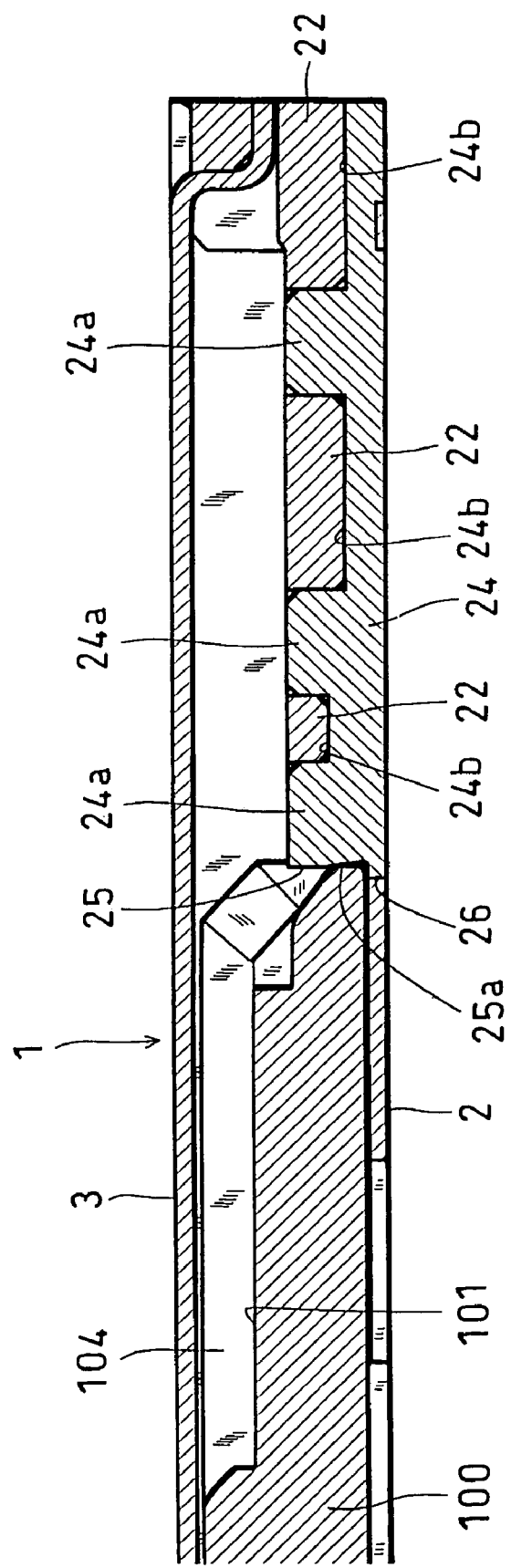
FIG. 12 is a section view illustrating the function of the erroneous card insertion preventing thickened portion in the case where the memory card is erroneously inserted into the slot of the card connector of the embodiment in a posture different from the normal insertion posture.
Figure 13:
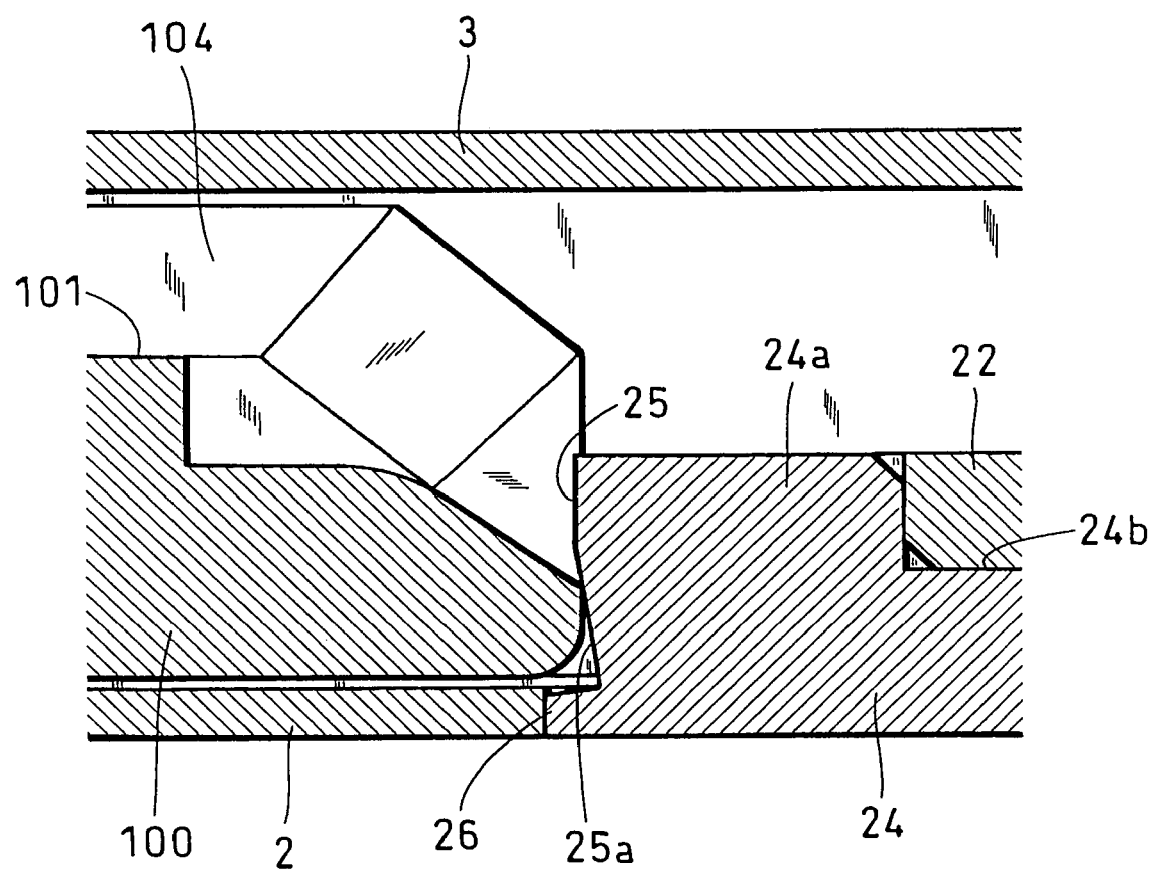
FIG. 13 is an enlarged section view illustrating the function of the erroneous card insertion preventing thickened portion in the case where the memory card is erroneously inserted into the slot of the card connector of the embodiment in the normal insertion posture.

Next, the erroneous card insertion preventing function provided in the card connector of the embodiment will be described with reference to FIGS. 3 to 8 and 9 to 13. FIG. 9 is a partial enlarged perspective view of a resin body showing an erroneous card insertion preventing thickened portion disposed in the card connector of the embodiment, FIG. 10 is an external perspective view of a core member which is to be embedded in the erroneous card insertion preventing thickened portion disposed in the card connector of the embodiment, FIG. 11 is a section view illustrating the function of the erroneous card insertion preventing thickened portion in the case where the memory card is inserted into a slot of the card connector of the embodiment in a normal insertion posture, FIG. 12 is a section view illustrating the function of the erroneous card insertion preventing thickened portion in the case where the memory card is erroneously inserted into the slot of the card connector of the embodiment in a posture different from the normal insertion posture, and FIG. 13 is an enlarged section view illustrating the function of the erroneous card insertion preventing thickened portion in the case where the memory card is erroneously inserted into the slot of the card connector of the embodiment in a posture different from the normal insertion posture.

The memory card 100 which is shown in FIG. 3, and which is to be used in the card connector of the embodiment is formed into a rectangular shape. One corner of the rectangle is removed away by the corner cut portion 102. The card 100 is inserted into the slot 5 from the slot inlet 4 in a state where the end portion of the card 100 on the side opposite to that of the card 100 in which the corner cut portion 102 is disposed is picked with the fingers, the card 100 is held in a posture in which the corner cut portion 102 is positioned in a front left corner portion, and the end portion of the card 100 in which the corner cut portion 102 is disposed faces the slot inlet 4. In one surface (lower face) of the card 100 which, in this insertion posture, is opposed to the surface of the resin body 2 on which the contacts 6 are laterally arranged in a line, terminal grooves 104 which are disposed respectively for the terminals 101 of the card 100, and in which the terminals 101 are exposed from the bottoms of the respective grooves, the half-lock engagement groove 103, and a notch portion 105 for preventing erroneous insertion of the card 100 are disposed so as to thin the card 100. The notch portion 105 is disposed in a side end portion on the side of the corner cut portion 102 (the left side) in the insertion end portion (front end portion) of the card. The plural terminal grooves 104 are laterally juxtaposed at regular intervals in the insertion end portion of the card 100 on the lateral side (right side) of the notch portion 105. The half-lock engagement groove 103 is disposed in a front portion of one side edge of the card 100 (a front portion of the left side edge) which is in the rear of the notch portion 105. When the card 100 is inserted in the insertion posture, the inserted card 100 is housed and held to the card attachment position of the slot 5 by the ejection mechanism 9, and at the same time the terminals 101 of the inserted card 100 make contact with and electrical connection to the internal contacts 7 of the contacts 6. When the operation of inserting the inserted card 100 is conducted in the state where the inserted card 100 is housed and held at the card attachment position of the slot 5, the inserted card 100 is discharged by the ejection mechanism 9 to the ejection position of the slot 5 and held to the ejection position. In the inserted card 100 held to the ejection position of the slot 5, the end portion protruding from the slot inlet 4 is pulled by picking with the fingers, whereby the card is removed away from the slot 5 via the slot inlet 4. In the card connector of the embodiment, the normal insertion posture of the card 100 is the insertion posture in which the card 100 is inserted into the slot 5 from the slot inlet 4 in a state where the end portion of the card 100 on the side opposite to that of the card 100 in which the corner cut portion 102 is disposed is picked with the fingers, the card 100 is held in a posture in which the corner cut portion 102 is positioned in a front left corner portion, and the end portion of the card 100 in which the corner cut portion 102 is disposed faces the slot inlet 4. According to the erroneous card insertion preventing function provided in the card connector of the embodiment, when the card 100 is erroneously inserted into the slot 5 in a posture different from the normal insertion posture, i.e., a longitudinally opposite posture in which the card 100 is inserted into the slot 5 from the end portion of the card 100 opposite to the end portion where the corner cut portion 102 is disposed, or a front and back reversed posture in which the surface of the card 100 where the terminal grooves 104 and the like are disposed is opposed to the surface of the cover 3, the erroneously inserted card 100 is prevented from being inserted to a card set position. As miniaturization of the card 100 is further advancing, the card 100 has a more tendency that the other end portion of the card 100 which is projected from the slot inlet 4 is pushed by, for example, the thumbs of the both hands in a state where the one end portion of the card 100 is pushed into the slot 5 from the slot inlet 4, irrespective of the posture, i.e., the normal insertion posture or a posture different from the normal insertion posture. A pushing force applied to the card 100 is increasing more than a former one.

As shown in FIGS. 4 to 13, the card connector of the embodiment comprises an erroneous card insertion preventing thickened portion 22 which is formed integrally with the resin body 2, and which is positioned in the notch region 105 of the card 100 that is to be inserted and housed in the card attachment position of the slot 5 in the normal insertion posture. The thickened portion 22 is formed into a rib shape having a rectangular section and elongating in the card insertion/ejection direction, on the rear left bottom face of the resin body 2 between the contacts 6 and the slider 19. The rear end of the thickened portion is connected to the rear side wall of the resin body 2. The width of the thickened portion 22 is narrower than that of the notch portion 105 of the card 100. The height of the thickened portion 22 is lower than the notch height (notch depth) of the notch portion 105 of the card 100. The length of the thickened portion 22 is set so that the front end is ahead of the internal contacts 7 positioned in the front ends of the contacts 6, and below the receiving portion 10 of the slider 19 at the ejection position. A card engagement face 23 that butts against and engages with the insertion end face of the card 100 which is erroneously inserted into the slot 5 from the slot inlet 4 in a posture different from the normal insertion posture (in the case of the longitudinally opposite posture, the end face of the end portion of the card 100 opposite to the end portion where the corner cut portion 102 is disposed, and, in the case of the front and back reversed posture, the end face of the end portion of the card 100 in which the corner cut portion 102 is disposed, and which is thinned by the notch portion 105) is formed by the front end face of the thickened portion 22.

As shown in FIGS. 5 to 8, and 11, when the card 100 is inserted into the slot 5 from the slot inlet 4 in the normal insertion posture, the thus formed thickened portion 22 is fitted into the notch region of the notch portion 105 of the card 100 slightly before the timing when the insertion end face of the card 100 (the end face of the end portion of the card 100 where the corner cut portion 102 is disposed) passes the contacts 6. The insertion of the card 100 which is beyond the card attachment position to the innermost pushed position is allowed, and the housing and holding of the card 100 at the card attachment position and the discharging to the ejection position by the ejection mechanism 9 are enabled. By contrast, as shown in FIGS. 12 and 13, when the card 100 is erroneously inserted into the slot 5 from the slot inlet 4 in a posture different from the normal insertion posture (FIGS. 12 and 13 show erroneous insertion of the card 100 in the front and back reversed posture), the insertion end face of the erroneously inserted card 100 is received by the engagement face 23 slightly before the timing when the insertion end face of the card 100 passes the contacts 6, thereby blocking further insertion of the card 100. Therefore, the thickened portion exerts the erroneous card insertion preventing function for preventing a situation where the erroneous insertion of the card 100 causes the internal mechanism of the card connector such as the contacts 6 or the ejection mechanism 9 to be broken, or removal of the card 100 to be disabled, from occurring.

In the embodiment, a core member 24 shown in FIG. 10 is embedded in the resin of the thickened portion 22. The core member 24 is made of a material which is higher in strength than the resin forming the body 2, i.e., the resin forming the thickened portion 22. The embodiment shows one blade-like member which is made a metal so that the thickened portion can be provided with breaking strength that is equivalent to or higher than conventional erroneous card insertion preventing means made of a metal. The erroneous card insertion preventing thickened portion 22 has the structure in which the outer envelope is made of a resin, and the core member 24 made of a metal that is higher in strength than the resin of the outer envelope is embedded in the outer envelope. Therefore, high breaking strength which cannot be attained by the resin only can be ensured, and the thickened portion has sufficient breaking strength. The insertion end face of the erroneously inserted card 100 butts against and engages with the engagement face 23 formed by the resin surface of the outer envelope of the thickened portion 22, thereby blocking the insertion of the card 100 to the card set position. Even when an excessive pushing force is applied to the card 100, therefore, the thickened portion 22 is not easily broken, and the insertion of the erroneously inserted card 100 to the card set position can be blocked while preventing the card 100 from being damaged or disabled from being ejected.

In the embodiment, the core member 24 is formed into one blade-like shape in which the bottom end face has a flat shape, the upper end face is formed into a concave and convex shape, one end is formed by breaking a convex portion 24a, and the other end is formed by breaking a concave portion 24b. As shown in FIGS. 9 and 11 to 13, the core member 24 is embedded in the thickened portion 22 so as to elongate from the front end to the rear end, in such a manner that the flat bottom end face of the core member 24 is exposed to be flush with the bottom face of the resin body 2, the end faces of the convex portions 24a of the core member 24 are exposed to be flush substantially with the upper face of the thickened portion 22, and a tall metal broken surface 25 which is broken in the convex portion 24a is slightly protruded from a middle portion of the engagement face 23 of the thickened portion 22. In this way, the metal broken surface 25 of the core member 24 is slightly protruded from the middle portion of the engagement face 23 of the thickened portion 22 against which the insertion end face of the erroneously inserted card 100 is to butt, thereby allowing the metal broken surface 25 of the core member 24 to bite the insertion end face of the erroneously inserted card 100 in a minimum degree, as shown in FIGS. 12 and 13. Therefore, the card 100 is prevented from slipping over the engagement face 23 of the thickened portion 22. According to the configuration, the erroneously inserted card 100 can be surely received by the thickened portion 22 of the resin body 2, and it is possible to obtain a sufficient erroneous card insertion preventing performance which cannot be obtained by the resin only.

In the embodiment, the metal broken surface 25 of the core member 24 protruded from the engagement face 23 of the thickened portion 22 against which the insertion end face of the erroneously inserted card 100 is to butt so as to make an engagement is subjected to a nonslip treatment (roughing process) such as a sandblast treatment or a knurling treatment, so that the surface contacting with the insertion end face of the erroneously inserted card 100 has a large coefficient of friction. Therefore, the card 100 can be surely prevented from slipping over the engagement face 23 of the thickened portion 22, and the erroneous card insertion preventing performance can be further enhanced.

In the embodiment, as shown in FIGS. 9 to 13, on the engagement face 23 of the thickened portion 22 against which the insertion end face of the erroneously inserted card 100 is to butt, and the metal broken surface 25 of the core member 24 protruded from the engagement face 23, tapered faces 23a and 25a are formed in which the engagement face 23 and the metal broken surface 25 are rearward inclined as advancing from the upper portion to the lower portion in the card insertion direction, in order to downward press the erroneously inserted card 100. According to the configuration, when the engagement face 23 of the thickened portion 22 and the metal broken surface 25 of the core member 24 protruded from the engagement face 23 receive the insertion end face of the erroneously inserted card 100, the card 100 is pressed against the resin body 2 by the tapered faces 23a and 25a formed on the engagement face 23 and the broken surface 25, so that the card 100 can be prevented from escaping in the direction of upward pressing the cover 3. Therefore, the erroneous card insertion preventing performance can be further enhanced.

In the embodiment, as shown in FIGS. 9 to 13, a pressing projection 26 which is forward protruded on the bottom face resin of the resin body 2, or which is protruded in the side of the lower face of the inserted card 100 is formed on the lower end of the metal broken surface 25 of the core member 24. The bottom face of the pressing projection 26 is exposed to be flush with the bottom face of the resin body 2. By contrast, the upper face of the pressing projection 26 is exposed from the inner bottom face of the resin body 2 with being downward tapered or inclined as advancing toward the tip end, in order to prevent the card 100 from being caught by the pressing projection 26. In this way, the pressing projection 26 which is protruded on the side of the lower face of the erroneously inserted card 100 is formed on the metal broken surface 25 of the core member 24 protruded from the engagement face 23 of the thickened portion 22 which is to butt against and engage with the insertion end face of the erroneously inserted card 100. According to the configuration, when the engagement face 23 of the thickened portion 22 and the metal broken surface 25 of the core member 24 receive the insertion end face of the erroneously inserted card 100, the core member 24 is prevented from being raised, by the card 100 through the pressing projection 26. Therefore, the above-mentioned function of the tapered faces 23*a*, 25*a* can be surely exerted.

In the embodiment, the bottom face of the core member 24 is exposed from the bottom face of the resin body 2, and, when the card connector is mounted onto a circuit board of an electronic apparatus, also the bottom face of the core member 24 is solder-fixed to the circuit board in the same manner as the external contacts 8 of the connectors 6. According to the configuration, the breaking strength of the thickened portion 22 itself, and the erroneous card insertion preventing performance can be further enhanced.

As apparent from the above, the erroneous card insertion preventing function (means) of the card connector of the embodiment provides a small and low-profile card connector which has sufficient breaking strength so that, even when an excessive pushing force is applied to the card 100, the card is not easily broken, which can prevent the card 100 from being damaged or disabled from being ejected, which can obtain a sufficient erroneous card insertion preventing performance, and which has an erroneous card insertion preventing function that has an enhanced performance in response to miniaturization of the card 100.

The embedding of the core member 24 into the thickened portion 22 is conducted by, during molding of the resin body 2, forming a hollow thickened portion 22 having a fitting recess of the same shape as the external shape of the core member 24, and, after the resin body 2 is molded, fitting the core member 24 into the fitting recess of the thickened portion 22 from the bottom face of the body. Alternatively, the embedding may be conducted by insert molding.

What is claimed is:

1. A card connector comprising: a housing which is configured by a body made of a resin, and a cover made of a sheet metal, and which forms a slot inlet through which a memory card is to be inserted, and a slot which is to house said memory card inserted through said slot inlet; and contacts which are mounted on said resin body, and which are to make contact with terminals of said memory card inserted and housed in a card attachment position of said slot, to establish electrical connection to said terminals, said card connector further comprising an erroneous card insertion preventing thickened portion which is formed integrally with said resin body, which is to be positioned in an erroneous insertion preventing notch region of said memory card that is inserted and housed in said card attachment position of said slot in a normal insertion posture, and which is to butt against an insertion end face of said memory card that is erroneously inserted in a posture different from the normal insertion posture, to block the insertion of said erroneously inserted memory card to a card set position, a core member being embedded in said thickened portion, said core member being made of a material that is higher in strength than said resin forming said body.

2. A card connector according to claim 1, wherein an end face of said core member is protruded from an end face of said thickened portion against which said insertion end face of said erroneously inserted memory card is to butt.

3. A card connector according to claim 1, wherein said core member is configured by a metal material.

4. A card connector according to claim 2, wherein said core member is configured by a metal material.

5. A card connector according to claim 2, wherein a nonslip treatment is applied to said end face of said core member protruded from said end face of said thickened portion against which said insertion end face of said erroneously inserted memory card is to butt.

6. A card connector according to claim 3, wherein a nonslip treatment is applied to said end face of said core member protruded from said end face of said thickened portion against which said insertion end face of said erroneously inserted memory card is to butt.

7. A card connector according to claim 4, wherein a nonslip treatment is applied to said end face of said core member protruded from said end face of said thickened portion against which said insertion end face of said erroneously inserted memory card is to butt.

8. A card connector according to claim 2, wherein tapered faces for downward pressing said erroneously inserted memory card are formed on said end face of said thickened portion against which said insertion end face of said erroneously inserted memory card is to butt, and said end face of said core member protruded from said end face of said thickened portion.

9. A card connector according to claim 3, wherein tapered faces for downward pressing said erroneously inserted memory card are formed on said end face of said thickened portion against which said insertion end face of said erroneously inserted memory card is to butt, and said end face of said core member protruded from said end face of said thickened portion.

10. A card connector according to claim 4, wherein tapered faces for downward pressing said erroneously inserted memory card are formed on said end face of said thickened portion against which said insertion end face of said erroneously inserted memory card is to butt, and said end face of said core member protruded from said end face of said thickened portion.

11. A card connector according to claim 5, wherein tapered faces for downward pressing said erroneously inserted memory card are formed on said end face of said thickened portion against which said insertion end face of said erroneously inserted memory card is to butt, and said end face of said core member protruded from said end face of said thickened portion.

12. A card connector according to claim 6, wherein tapered faces for downward pressing said erroneously inserted memory card are formed on said end face of said thickened portion against which said insertion end face of said erroneously inserted memory card is to butt, and said end face of said core member protruded from said end face of said thickened portion.

13. A card connector according to claim 7, wherein tapered faces for downward pressing said erroneously inserted memory card are formed on said end face of said thickened portion against which said insertion end face of said erroneously inserted memory card is to butt, and said end face of said core member protruded from said end face of said thickened portion.

14. A card connector according to claim 8, wherein a pressing projection which is to be protruded toward a lower face of said erroneously inserted memory card is formed on said end face of said core member protruded from said end face of said thickened portion against which said insertion end face of said erroneously inserted memory card is to butt.

15. A card connector according to claim 9, wherein a pressing projection which is to be protruded toward a lower face of said erroneously inserted memory card is formed on said end face of said core member protruded from said end face of said thickened portion against which said insertion end face of said erroneously inserted memory card is to butt.

16. A card connector according to claim 10, wherein a pressing projection which is to be protruded toward a lower face of said erroneously inserted memory card is formed on said end face of said core member protruded from said end face of said thickened portion against which said insertion end face of said erroneously inserted memory card is to butt.

17. A card connector according to claim 11, wherein a pressing projection which is to be protruded toward a lower face of said erroneously inserted memory card is formed on said end face of said core member protruded from said end face of said thickened portion against which said insertion end face of said erroneously inserted memory card is to butt.

18. A card connector according to claim 12, wherein a pressing projection which is to be protruded toward a lower face of said erroneously inserted memory card is formed on said end face of said core member protruded from said end face of said thickened portion against which said insertion end face of said erroneously inserted memory card is to butt.

19. A card connector according to claim 13, wherein a pressing projection which is to be protruded toward a lower face of said erroneously inserted memory card is formed on said end face of said core member protruded from said end face of said thickened portion against which said insertion end face of said erroneously inserted memory card is to butt.

20. A card connector according to claim 1, wherein a bottom face of said core member is exposed from a bottom face of said resin body, and said core member is to be solder-fixed to a circuit board of an electronic apparatus.

21. A card connector according to claim 2, wherein a bottom face of said core member is exposed from a bottom face of said resin body, and said core member is to be solder-fixed to a circuit board of an electronic apparatus.

22. A card connector according to claim 3, wherein a bottom face of said core member is exposed from a bottom face of said resin body, and said core member is to be solder-fixed to a circuit board of an electronic apparatus.

23. A card connector according to claim 4, wherein a bottom face of said core member is exposed from a bottom face of said resin body, and said core member is to be solder-fixed to a circuit board of an electronic apparatus.

24. A card connector according to claim 5, wherein a bottom face of said core member is exposed from a bottom face of said resin body, and said core member is to be solder-fixed to a circuit board of an electronic apparatus.

25. A card connector according to claim 6, wherein a bottom face of said core member is exposed from a bottom face of said resin body, and said core member is to be solder-fixed to a circuit board of an electronic apparatus.

26. A card connector according to claim 7, wherein a bottom face of said core member is exposed from a bottom face of said resin body, and said core member is to be solder-fixed to a circuit board of an electronic apparatus.

27. A card connector according to claim 8, wherein a bottom face of said core member is exposed from a bottom face of said resin body, and said core member is to be solder-fixed to a circuit board of an electronic apparatus.

28. A card connector according to claim 9, wherein a bottom face of said core member is exposed from a bottom face of said resin body, and said core member is to be solder-fixed to a circuit board of an electronic apparatus.

29. A card connector according to claim 10, wherein a bottom face of said core member is exposed from a bottom face of said resin body, and said core member is to be solder-fixed to a circuit board of an electronic apparatus.

30. A card connector according to claim 11, wherein a bottom face of said core member is exposed from a bottom face of said resin body, and said core member is to be solder-fixed to a circuit board of an electronic apparatus.

31. A card connector according to claim 12, wherein a bottom face of said core member is exposed from a bottom face of said resin body, and said core member is to be solder-fixed to a circuit board of an electronic apparatus.

32. A card connector according to claim 13, wherein a bottom face of said core member is exposed from a bottom face of said resin body, and said core member is to be solder-fixed to a circuit board of an electronic apparatus.

33. A card connector according to claim 14, wherein a bottom face of said core member is exposed from a bottom face of said resin body, and said core member is to be solder-fixed to a circuit board of an electronic apparatus.

34. A card connector according to claim 15, wherein a bottom face of said core member is exposed from a bottom face of said resin body, and said core member is to be solder-fixed to a circuit board of an electronic apparatus.

35. A card connector according to claim 16, wherein a bottom face of said core member is exposed from a bottom face of said resin body, and said core member is to be solder-fixed to a circuit board of an electronic apparatus.

36. A card connector according to claim 17, wherein a bottom face of said core member is exposed from a bottom face of said resin body, and said core member is to be solder-fixed to a circuit board of an electronic apparatus.

37. A card connector according to claim 18, wherein a bottom face of said core member is exposed from a bottom face of said resin body, and said core member is to be solder-fixed to a circuit board of an electronic apparatus.

38. A card connector according to claim 19, wherein a bottom face of said core member is exposed from a bottom face of said resin body, and said core member is to be solder-fixed to a circuit board of an electronic apparatus.

* * * * *